US007546610B2

(12) United States Patent
Aridor et al.

(10) Patent No.: US 7,546,610 B2
(45) Date of Patent: Jun. 9, 2009

(54) METHOD FOR MANAGING MULTI-TIER APPLICATION COMPLEXES

(75) Inventors: Yariv Aridor, Zichron-Yaakov (IL); Ofer Biran, Haifa (IL); Srirama Krishnakumar, White Plains, NY (US); Gregory Pruett, Raleigh, NC (US); Ben-Ami Yassour, Technion (IL)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 10/620,631

(22) Filed: Jul. 16, 2003

(65) Prior Publication Data

US 2005/0033794 A1 Feb. 10, 2005

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/320; 719/318
(58) Field of Classification Search ........... 719/320, 719/318; 709/203, 221
See application file for complete search history.

(56) References Cited

U.S. PATENT DOCUMENTS

| | | | | |
|---|---|---|---|---|
| 5,951,694 | A * | 9/1999 | Choquier et al. | 714/15 |
| 5,956,489 | A * | 9/1999 | San Andres et al. | 709/221 |
| 6,697,849 | B1 * | 2/2004 | Carlson | 709/219 |
| 6,813,637 | B2 * | 11/2004 | Cable | 709/226 |
| 6,950,848 | B1 * | 9/2005 | Yousefi'zadeh | 709/203 |
| 2002/0032769 | A1 * | 3/2002 | Barkai et al. | 709/224 |
| 2002/0091854 | A1 * | 7/2002 | Smith | 709/236 |
| 2003/0126202 | A1 | 7/2003 | Watt | |
| 2005/0033717 | A1 * | 2/2005 | Ellis et al. | 707/1 |

OTHER PUBLICATIONS

Abbondanzio et al., "Management of application complexes in multitier clustered systems," Technical forum, IBM, published Jan. 16, 2006; retrieved from <http://www.research.ibm.com/journal/sj/421/forum.html> on Aug. 20, 2008.*

* cited by examiner

*Primary Examiner*—Li B Zhen
*Assistant Examiner*—Nathan Price (57) ABSTRACT

A computer-implemented framework and method for managing application complexes comprising multiple tiers of servers, where servers in a common tier run an identical application and servers in different tiers run different applications, and all the servers work together to provide a specific service, the application complex being definable via an application complex type. The framework has a plugin interface adapted for connection to the framework of a plugin in respect of each application complex type, the plugin encapsulating a relationship between disparate resources composing the respective application complex type and respective characteristics of said resources. A user interface in the framework provides general tasks that are independent of operational semantics of the application complex and is responsive to user operations for interfacing with the framework for defining an instance of the application complex and allowing the user to populate the application complex with servers.

3 Claims, 8 Drawing Sheets

METHOD FOR MANAGING MULTI-TIER APPLICATION COMPLEXES

FIELD OF THE INVENTION

This invention relates to management of networked computers.

BACKGROUND OF THE INVENTION

Autonomic computing reflects a vision to develop and deploy intelligent systems that self-manage and regulate themselves, much the way the human autonomic nervous system manages the human body. This vision is motivated by the tremendous complexity in today's computing environments and the resultant difficulties and expense of managing them. The biological metaphor suggests a systemic approach, coordinating activity across the many components of computing systems, achieving a much higher level of automation.

Within the context of the present invention, an application-complex is defined as multiple tiers of servers, where the servers in the same tier run the same application and those in different tiers run different applications, and all the servers work together to provide a specific service. An example of a 4-tier application-complex is a Load Balancer ('singleton' tier) followed by Web Servers tier, followed by web application servers, followed by a database. Such an application-complex might provide an e-commerce service. The application complex entity presents a view in which the inter-relations and dependencies, the deployment properties, and operational characteristics of the components are hidden.

The high complexity of the management tasks, and specifically the Total Cost of Ownership, involved with application-complexes including deploying, monitoring and keeping the services in 'healthy' operational state imposes a high overhead on system management. For example, the addition of a new server to augment an overloaded system requires constant monitoring and analysis of the system load, identification of an overload, selecting an appropriate reserve server and its configuration properties, connection thereof and upgrading system properties. Although some of these tasks have been automated, complete automation for application-complexes has not yet been achieved.

Automatic monitoring and configuration of application-complexes has been addressed by an IBM internal prototype implementation referred to as "Raquarium" that has been integrated into the IBM Director system management tool (specifically into its Rack Manager component). IBM is a registered trademark of International Business Machines Corporation of Armonk, N.Y., USA. Raquarium as disclosed in the IBM Systems Journal, Vol. 42, No. 1, was published on the Internet on Jan. 23, 2003. Raquarium eases management of appliance edge servers in rack-mounted and server blades environments and has demonstrated management of application-complexes in the IBM WebSphere Edge Server domain, in environment of rack mounted servers and server blades. However, Raquarium is equally well-suited for use in other multi-server environments.

Raquarium provides the following life-cycle management functions for application complexes:
automatic deployment—configures the participating servers to work together, each with its specific application component and role.
Performance monitoring and analysis which is based on the structural knowledge of the entire application complex.

Automatic server allocation and configuration provides capacity-on-demand management and hardware failover support.

The initial release of Raquarium provides no network isolation (required for supporting multiple customers environments) such that access between servers within a cluster is not restricted. The initial release also restricts provisioning to preinstalled applications: there is currently no provision of OS and application deployment based on image repositories.

BRIEF SUMMARY OF THE INVENTION

It is an object of the invention to provide a universal framework and interface for automating monitoring and configuration of application-complexes.

This object is realized in accordance with a broad aspect of the invention by a computer-implemented framework for managing application complexes, each application complex comprising multiple tiers of servers, where servers in a common tier run an identical application and servers in different tiers run different applications, and all the servers work together to provide a specific service, said application complex being definable via an application complex type, said framework comprising:
a plugin interface adapted for connection to the framework of a plugin in respect of each application complex type, wherein said plugin encapsulates a relationship between disparate resources composing the respective application complex type and respective characteristics of said resources, and
a user interface providing general tasks that are independent of operational semantics of the application complex and that is responsive to user operations for interfacing with the framework for defining an instance of the application complex and allowing the user to populate the application complex with servers.

One embodiment of the invention, as implemented by IBM's Raquarium prototype mentioned above, is implemented as a management framework (a container-style implementation) where application complex types are introduced as "plugins" that provide the specific wisdom of their application complex type, by implementing a "Configuration Provider Interface" (constituting a plugin interface). The Configuration Provider plugin defines the structure of the application complex, including the structure of the tiers, the application component in each tier, whether it is scalable by adding instances of the applications, and whether it is shareable with other application complexes. The plugin also identifies the properties that require the administrator to supply input values (e.g., threshold values for controlling events). It also collects and publishes monitoring data selected by the administrator via the management framework, generates status events, and issues requests to add or remove servers. The management framework (or simply "framework") provides the visualization GUI (graphical user interface) of application complexes and clustered servers, and manages the free server pool and the allocation of servers. Finally, it applies a power management policy on the free pool such that the servers will be powered off until they are needed.

As an example, consider a two-tier application complex in which the first tier consists of an IBM e-network dispatcher that acts as load balancer, and multiple Web servers comprising the second tier. When the plugin detects an excess load on the Web servers, it requests an additional Web server from the framework. If the framework determines that an available Web server can be selected (from the free pool), it then calls the plugin to perform the necessary configuration actions.

These may include updating the network dispatcher IP (Internet Protocol) tables, provisioning the correct content on the Web server, and so on. The plugin is also called to perform the necessary configurations if the same scenario is initiated by a user operation such as dragging a Web server icon from the free pool on to an application complex view.

Raquarium provides an SDK (software development kit) to assist in the development of application complex plugins that meet the Configuration Provider Interface. These plugins can be managed by the Raquarium framework to provide a consistent user experience for different types of application complexes.

Thus, in summary, the invention is a new paradigm of systems management of an application-complex as a single managed entity. In its essence, there is a management framework which provides standard ways for capacity-on-demand and life-cycle management of application-complexes. Each application-complex type is introduced to the framework as a plugin conforming to a standard Configuration-Provider interface. The application-complex is managed as s ingle entity, much like individual servers, upon which global management operations are applied. The basic functionality of systems management enabled for application-complexes includes:

Automatic initial configuration of the participating servers to work together.
Performance monitoring based on analysis and structural knowledge of the whole application-complex.
Automatic allocation/removal of servers according to the application-complex performance state.
GUI visualization of application-complex managed objects; Drag/drop of servers between application-complexes and to (from) a free pool of servers.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
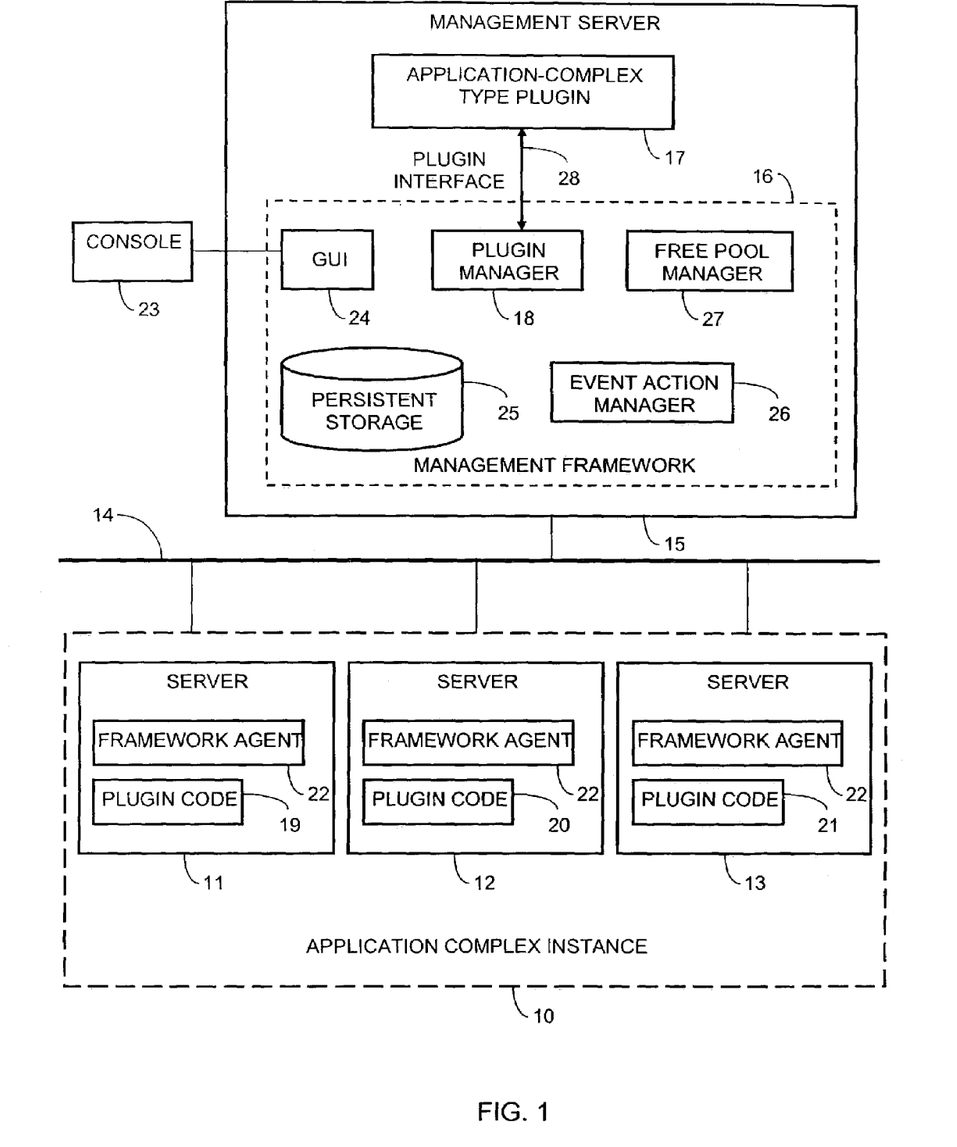
FIG. 1 is a block diagram showing functionally the management framework, a plugin for an application complex type and servers included in an application complex instance, controlled according to the invention.

FIG. 1 is a block diagram of the preferred embodiment showing functionally an application complex instance designated generally as 10 comprising three servers 11, 12 and 13 each connected via a network 14 to a management server 15. The management server 15 implements a framework designated generally as 16 that operates in conjunction with a plurality of configuration provider plugins 17, each of which is specific to a corresponding application complex type and enables the framework to configure one or more of the servers to operate in conjunction with a supported application complex type. To this end, a plugin manager 18 in the framework 16 allows connection of the plugins 17 that conform to the configuration provider interface (plugin interface) 28 and operate in conjunction with an agent-side code deployed as respective plugin extensions 19, 20, 21 to the framework management agent on the respective servers 11, 12 and 13. The framework 16 may also provide the plugin utilities for persistent storage and accessing its agent-side code on each server. To this end, each server may include a framework agent 22 that allows the framework 16 to execute server operations remotely. The framework 16 is controlled by means of a console 23 that is external to the framework 16 and is coupled thereto via a GUI (graphical user interface) 24.

The framework 16 comprises a persistent storage unit (e.g. a hard disk) 25 for bulk storage. An event action manager 26 within the framework 16 detects events at the level of the application complex to which the framework 16 must respond in conjunction with the plugins. Such an event might, for example, be a decrease in performance of one of the servers possibly owing to an overload, requiring auxiliary processing by a free server that is connected to the management server 15 and controlled by the framework 16. The free server is taken from a "pool" managed by a free server pool manager 27 in the framework 16. The plugins 17 communicate with the plugin manager 18 via a plugin interface 28 that defines a software protocol that informs the framework how to receive information from and send information to the plugins for configuring an application complex instance.

In a preferred embodiment, the plugin manager 18, the event action manager 26 and the free server pool manager 27 are implemented as software modules by a processor in the framework and operate according to the logic described below with reference to FIG. 3-10 of the drawings.

Figure 2:
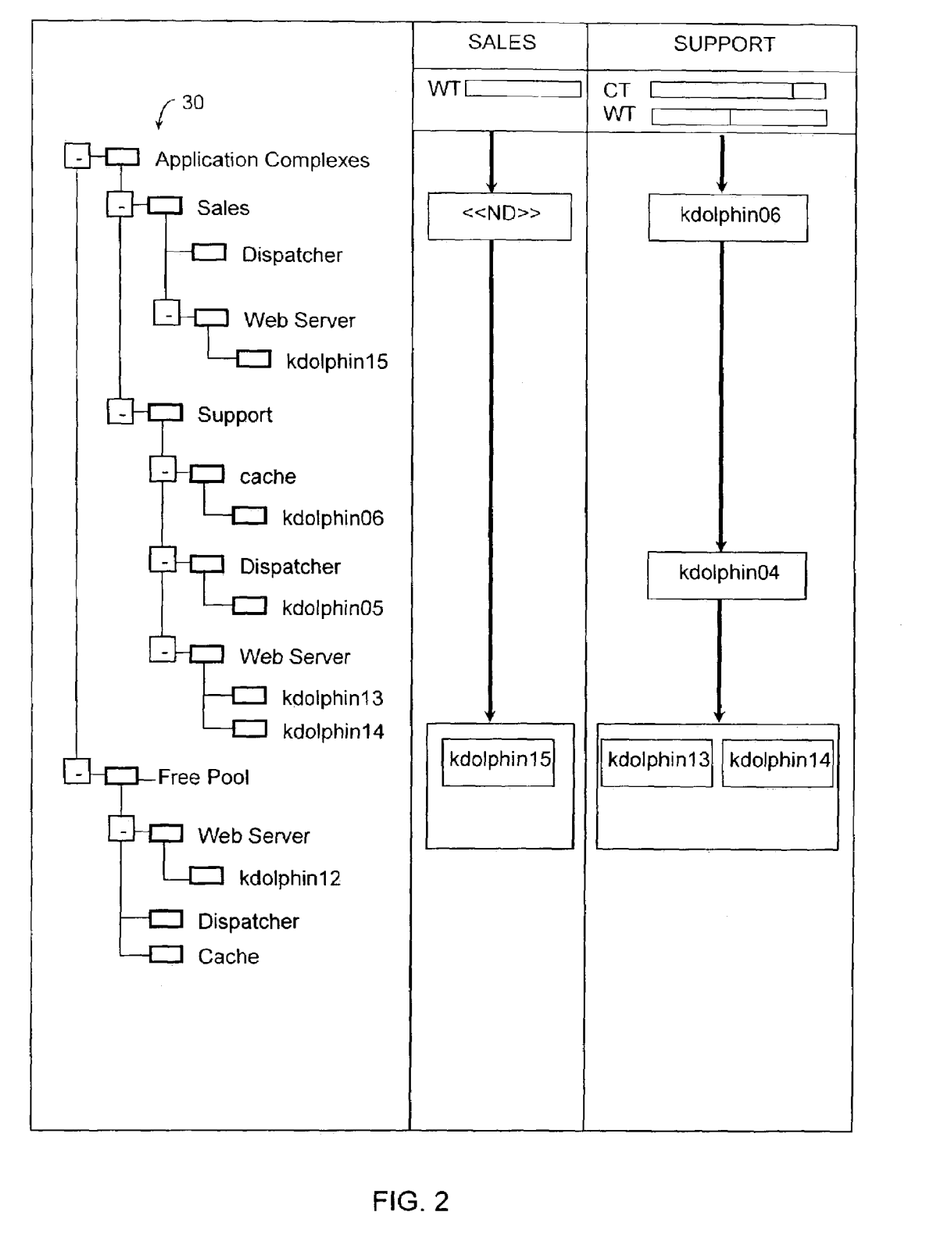
FIG. 2 is a pictorial representation of a graphical user interface providing visualization and management operations for the application complexes.

FIG. 2 is a graphical view of application-complexes implemented on the IBM Director. This view provides a tier-structure visualization of the application-complexes, shows the performance monitors, and supports drag/drop operations on servers to reassign them between application-complexes and to (from) the free pool. Two application-complexes: Sales and Support are shown. Sales, has a tier of Network Dispatcher, and a scalable tier of Web servers. Sales is 'non-operational' since its network-dispatcher tier is not populated. Support, has a tier of reverse caching proxy, a tier of Network Dispatcher, and a scalable tier of Web servers.

The left panel presents a tree view 30 of the application-complexes and the free pool of servers i.e., those that do not currently participate in any application-complex. The free servers are presented according to their role under the free pool branch. It is seen from the tree-hierarchy that only one web server appears in the free pool and is therefore available for application complexes.

FIGS. 3 to 10 are flow diagram showing the principal operating steps carried out by the framework 16 and/or by the an instance of a plugin that supports an application-complex type under various scenarios. These scenarios and the operations carried out therein are described in further detail below.

The invention can be defined by three integrated components:

Framework functionality including GUI visualization and semantics of operations provided to the administrator for managing application-complexes.
Configuration-Provider interface.
Interaction between the framework operations and the Configuration-Provider interface.

Each of these components will now be described in detail.

1. Framework Functionality

User Objects
Free pool of servers, visualized according to their roles (e.g., Web Servers).

application-complex, each visualized to show its tiers, the current servers in each tier, and its monitors and their values.

Event notification.

Main User Operations
  Create a new application-complex. Various properties are presented to the user to fill required values.
  Change the values of existing application-complex properties.
  Move a server from the free pool into a tier of an application-complex.
  Move a server from a tier of an application-complex into a tier of another application-complex.
  Move a server from a tier of an application-complex into the free pool.
  Get event notification for application-complex status (controlled by user settings on the framework).

Automatic Server Allocation/Re-allocation
  Server automatically moved from the free pool into a tier of an application-complex.
  Server automatically moved from an application-complex tier into the free pool.

2. Configuration-Provider Interface

Each application-complex type is introduced to the framework as a plugin that conforms to the Configuration-Provider interface. The Configuration-Provider interface is the interface between a plugin and the management framework. In the following description, the plugin that conforms to the Configuration-Provider interface will also be termed a Configuration-Provider since it is a provider of configuration, by conforming to the interface. The Configuration-Provider should provide the following information/functions for the application-complex it supports:
  Defines the number of tiers, the specific application in each tier and whether that tier is Scalable (i.e., can have multiple servers running the tier's application).
  Defines the required properties for which values should be input from the user. These properties include configuration properties (which are essential for inter-component configuration and for adaptation to the local environment e.g., content provisioning source) and performance thresholds (used to determine the application-complex performance status).
  Performs the required reconfigurations when the properties' values are changed by the user.
  Defines properties that are monitored and presented to the user. Examples of such monitored properties include average CPU utilization of the servers included in the application-complex. This might be presented textually by a text field that is updated periodically (with values 20%, 30% . . . ) or graphically by a slider. The manner in which the monitored properties are presented to the user may be user-selectable or predetermined for each specific implementation.
  Performs the required configurations when a server is added (removed) to (from) a specific tier of the application-complex (this may involve reconfiguration of other servers of the application-complex, not just the configuration of the added (removed) one).
  Reports the values of the monitored properties and general performance statuses of the application-complex.
  May ask the framework for additional servers or for removal of servers in scalable tiers.

A simplified example of a Configuration-Provider interface in pseudo-Java is now given:

Interface Configuration-Provider
  Define the number of tiers, the application in each tier and whether that tier it is Scalable:

```
TierDefinition[ ] getTierDefinitions( );
```

(returns array of TierDefinition objects—see class TierDefinition below).
  Define the required properties for which values should be input from the user:

```
AppComplexProperties getAppComplexProperties( );
```

(see class AppComplexProperties below).
  Performs the required reconfigurations when the properties' values are changed by the user.

```
appServicePropertiesChanged(AppComplexProperties
    newProperties);
```

Define which monitored properties are to be presented to the user:

```
Monitor[ ] getMonitors( );
```

(returns array of Monitor objects, see the Monitor class below).
  Perform the required reconfigurations when a server is added (removed) to (from) one of the application-complex's tiers:

```
addServer (
    int tier,        // tier index.
    String server    // the added server tcp/ip name.
);
removeServer (
    String server // the removed server tcp/ip name.
);
```

Reports the monitor properties and general performance status of the application-complex:

```
AppComplexState monitor( );
```

(see class AppComplexState below).

Class TierDefinition

```
String Application;  // The application running in this tier.
boolean scalable;    // Indicates whether the tier can contain multiple
servers running the application
```

Class AppComplexProperties

This class can simply be a list of text properties, or a more complex structure that defines also the GUI to get values for the properties (e.g., separation for properties notebook pages). For simplicity it optionally contains also the values (so it can be used for getAppComplexProperties output as well as appServicePropertiesChanged input).

Class Monitor

This class may contains string texts for presenting the meaning of monitored properties to the user, and definition of the value type (e.g. percentage) that enables the framework to choose a proper GUI for showing the monitored parameter. Thus, in the example given above, the meaning of a monitored property is "average CPU utilization of the servers included in the application-complex" and the type is "percentage". Thus, in this example, the framework's GUI may choose to present the monitored property as a slider 0 . . . 100.

Class AppComplexState

```
int status;   // Status indication (a framework constant, e.g. STATUS_OK,
STATUS_PERFORMANCE_PROBLEM . . . etc.).
String message; // An optional message that explains the status.
float[ ] monitors; // A value for each Monitored property defined by the
getMonitors() method.
```

Class FrameworkUtil

This class may be used by the Configuration-Provider to ask the framework for additional server or return a server.

```
requestServer (
   String Application // The application role of the requested server.
   );
returnServer (
   String server   // the returned server tcp/ip name.
   );
```

3. Interaction Between the Framework Operations and the Configuration-Provider Interface Referring again to FIGS. 3 to 10 there will now be described in detail the principal operating steps carried out by the framework 16, shown in FIG. 1, and/or by an instance of a Configuration-Provider plugin that supports an application-complex type under various scenarios.

In order that the interaction definitions will be more tangible to the reader, they are accompanied (where appropriate) by the demonstration of an exemplary application-complex type. The example employs a simple application-complex type—Web Servers Cluster ("WSC"), which has two tiers. The first tier consists of a load balancer, being a non-scalable tier, i.e. it can contain just a single application component—the load balancer. The second tier consists of Web servers constituting a scalable tier, i.e. it can contain multiple application components—Web servers in our case.

The figures show general instances of the framework's behavior when implementing different operations and are described below with further reference to specific exemplary non-limiting scenarios.

Figure 3:
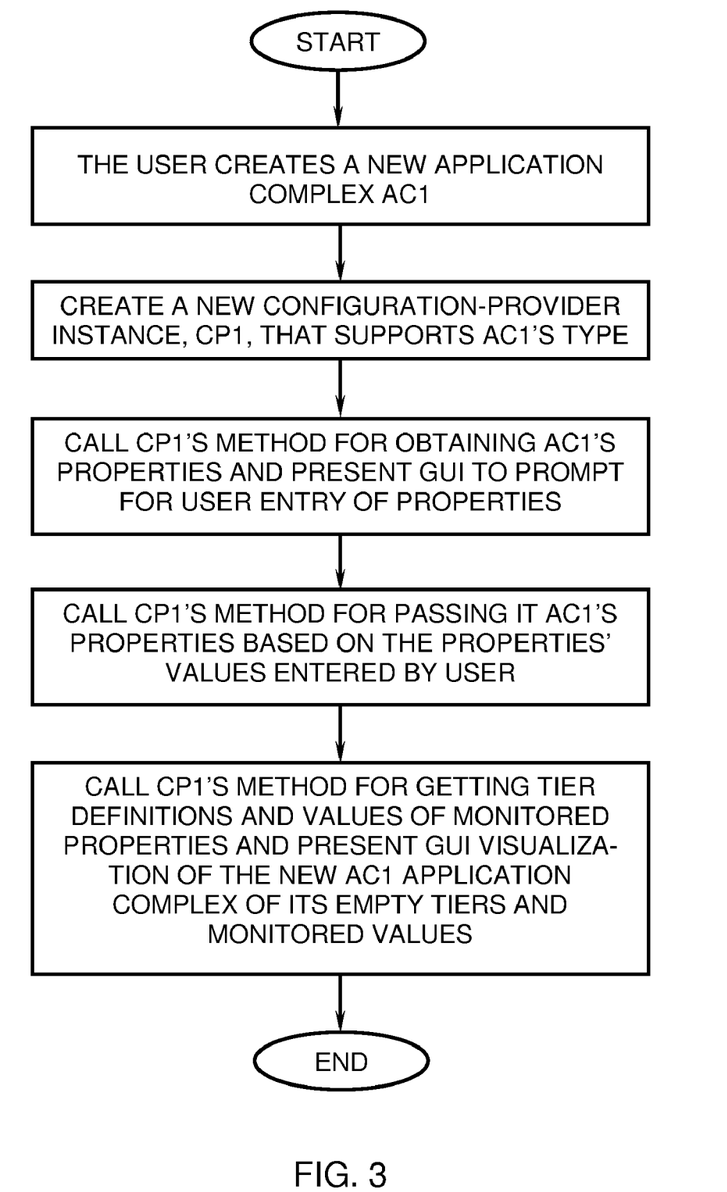
FIGS. 3 to 10 are flow diagrams showing the principal operating steps carried out by the framework or by the plugins in accordance with FIG. 1 for creation and re-configuring application complexes under different scenarios.

As shown in FIG. 3, the user creates a new application-complex AC1. Thus, in the example, AC1 is of type WSC.

The framework creates a new Configuration-Provider instance, CP1, that supports AC1's type. Thus, in the example, CP1 is an instance of the plugin for the WSC type.

The framework calls CP1.getAppComplexProperties( ) and presents a GUI to get the user values for the properties. Thus, in the example, properties for WCS typically include the virtual IP address to be used by the load balancer, information on an FTP server and content path from which Web content should be copied to each Web server added to the application-complex, and a threshold value for a reasonable average CPU utilization of the Web servers.

The framework calls CP1.appServicePropertiesChanged (newProperties) to pass the properties values entered by the user via the GUI, to CP1. Thus, in the example, the framework passes to CP1 the virtual IP address, the FTP server and content information and the threshold entered by the user, so CP1 can later use them to apply the required configurations, and to determine the performance status.

The framework calls CP1.getTierDefinitions( ) and CP1.getMonitors( ) and presents the GUI visualization of the new AC1 application-complex—visualization of its (currently empty) tiers and monitored properties. In the example, CP1 in getTierDefinitions( ) returns an array of two objects of type TierDefinition: in the first object, the Application field has "Load-Balancer" value, and the Multiple field has "false" value. The second TierDefinition object has "Web-Server" and "true" values correspondingly. In the getMonitors method CP1 returns an array of one Monitor element, with a description field that has "average CPU utilization of the Web servers", and a type field that has "percentage". The framework presents an application-complex with two (empty for now) tiers and one monitor (with 0-100% slider visualization, and a description text "average CPU utilization of the Web servers".

Figure 4:
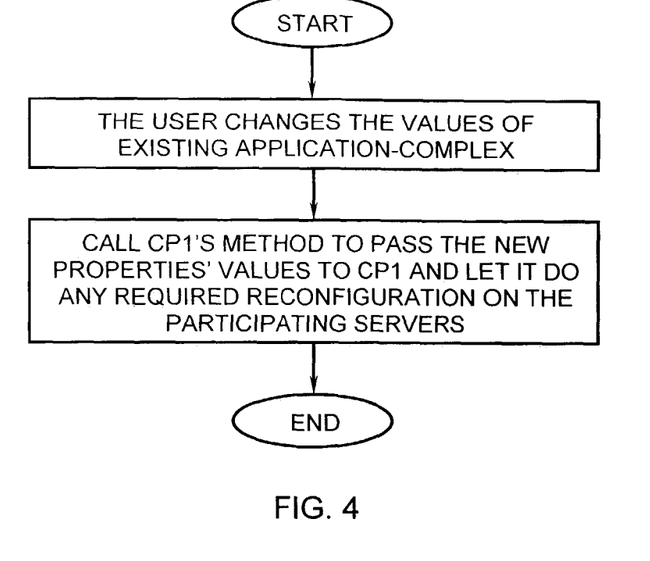

In FIG. 4 and the subsequent flow diagrams, CP1 will be used to denote the Configuration-Provider instance that was created for the application-complex in context. FIG. 4 depicts a user-initiated re-configuration of the application-complex.

The user changes the values of existing application-complex properties.

The framework calls CP1.appServicePropertiesChanged (newProperties) to pass the new properties values to CP1 and let it do any required reconfiguration on the participating servers. Consider by way of example that the user changed the FTP server and content information. In this case, CP1 copies a new Web content to each Web server contained in the Web servers tier.

Figure 5:
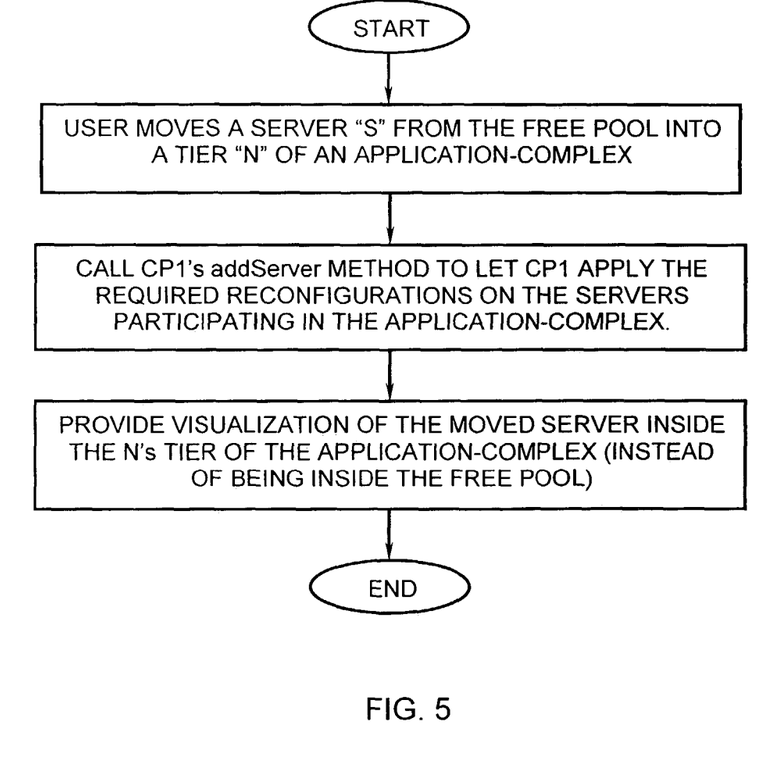

FIG. 5 depicts another kind of a user-initiated change in the configuration of the application-complex.

The user moves a server S from the free pool into a tier N of an application-complex. In the example, the user moves a Web server into the second tier.

The framework calls CP1.addServer(S, N) to let CP1 apply the required reconfigurations on the participating servers. Thus, in the example, CP1, in the addServer method, applies a configuration change on the Load balancer (contained in the first tier) to make it dispatch Web requests also to the server S. CP1 also copies the Web content (according to the FTP and content information property of the application-complex instance) on to S.

The framework provides visualization of the moved server inside the N's tier of the application-complex (instead of being in the free pool). Thus, in the example, the new Web server S is visualized inside the second tier of the application-complex.

Figure 6:
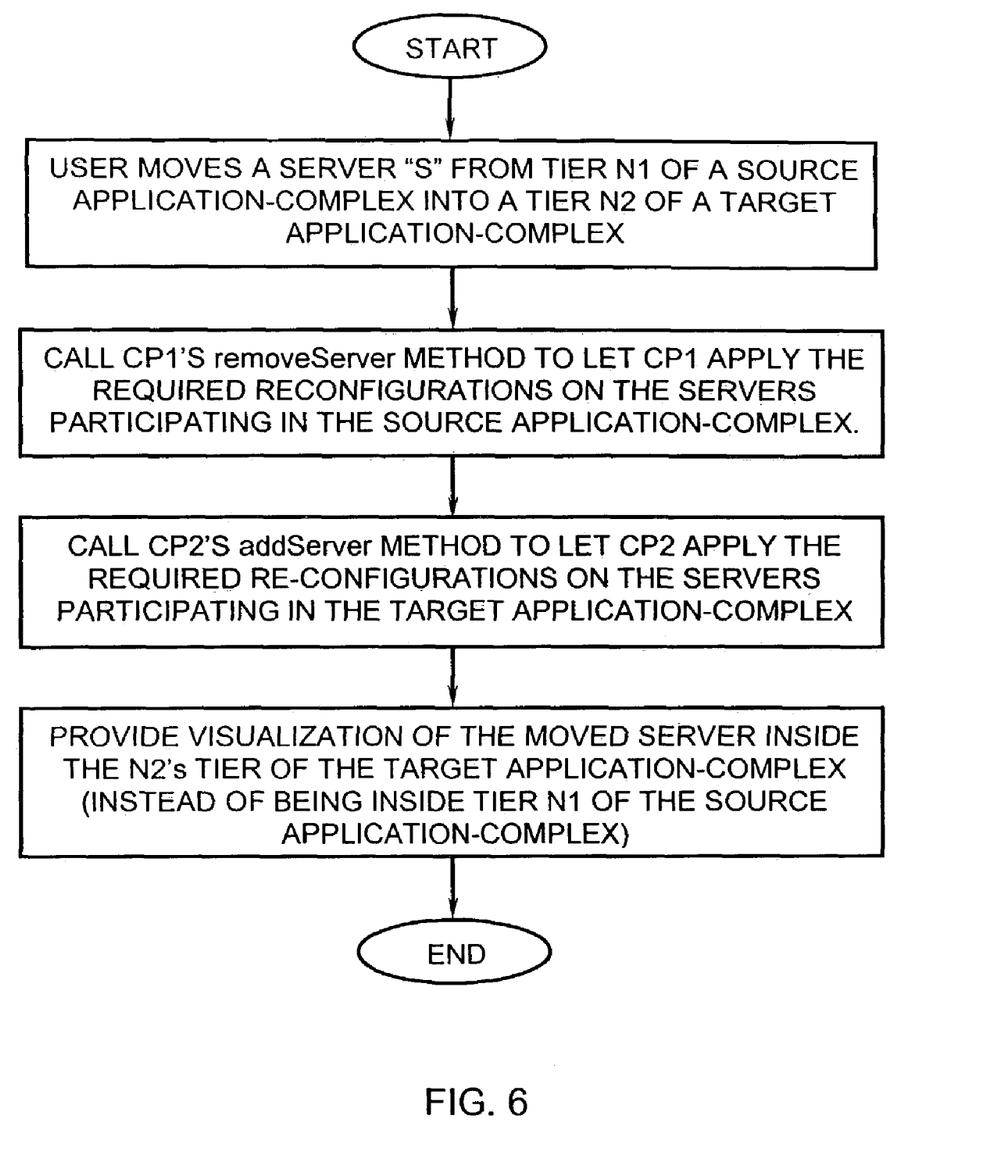

FIG. 6 depicts yet another kind of user-initiated change in the configuration of the application-complex.

The user moves a server S from tier N1 of an application-complex into a tier N2 of another application-complex. In the example both application-complexes are of type WSC, and the user moves a Web server from second tier of the source Application-complex into the second tier of the target application-complex.

The framework calls CP1.removeServer(S) to let CP1 apply the required reconfigurations on the servers participating in the source application-complex. Thus, in the example, CP1, in the removeServer method, applies a configuration change on the Load balancer (contained in the first tier) not to dispatch any more Web requests to the server S.

The framework calls CP2.addServer(S, N2) to let CP1 apply the required reconfigurations on the servers participating in the target application-complex (CP2 is the Configuration-Provider instance that was created for the target application-complex). In the example, CP2, in the addServer method, applies a configuration change on the Load balancer (contained in the first tier) to make it dispatch Web requests also to the server S. CP2 also copies the Web content (according to the FTP and content information property of the target application-complex instance) onto S.

The framework provides visualization of the moved server inside the N2's tier of the target application-complex (instead of being inside tier N1 of the source application-complex).

Figure 7:
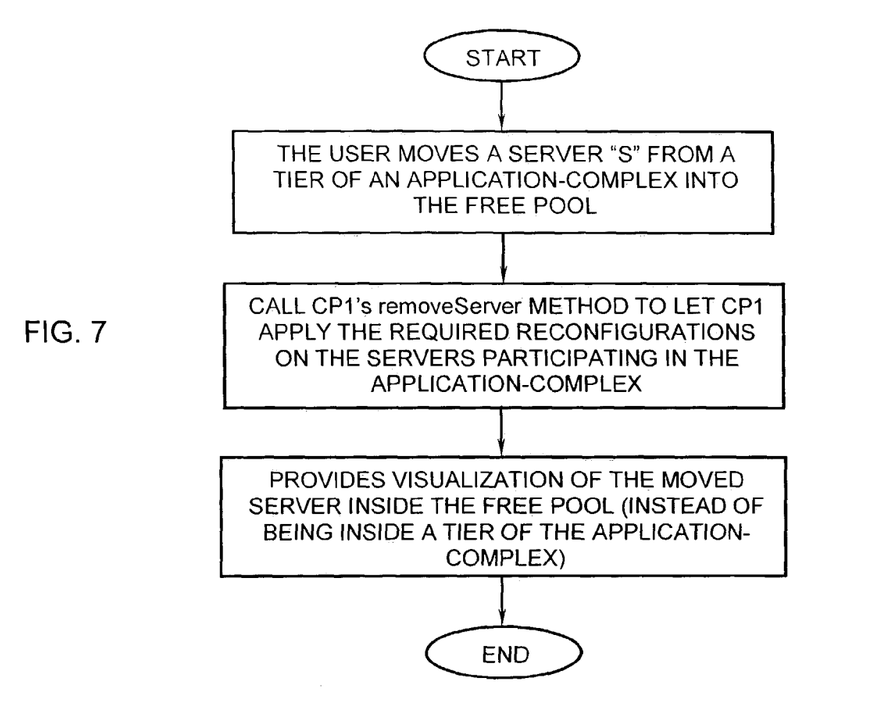

FIG. 7 depicts another kind of user-initiated change in the configuration of the application-complex.

The user moves a server from a tier of an application-complex into the free pool. In the WCS example, the user moves a Web server S from the second tier to the free pool.

The framework calls CP1.removeServer(S) to let CP1 apply the required reconfigurations on the servers participating in the application-complex. In the example, CP1, in the removeServer method, applies configuration change on the Load balancer (contained in the first tier) to not dispatch any more Web requests to the server S.

The framework provides visualization of the moved server inside the free pool (instead of being inside a tier of the application-complex).

Figure 8:
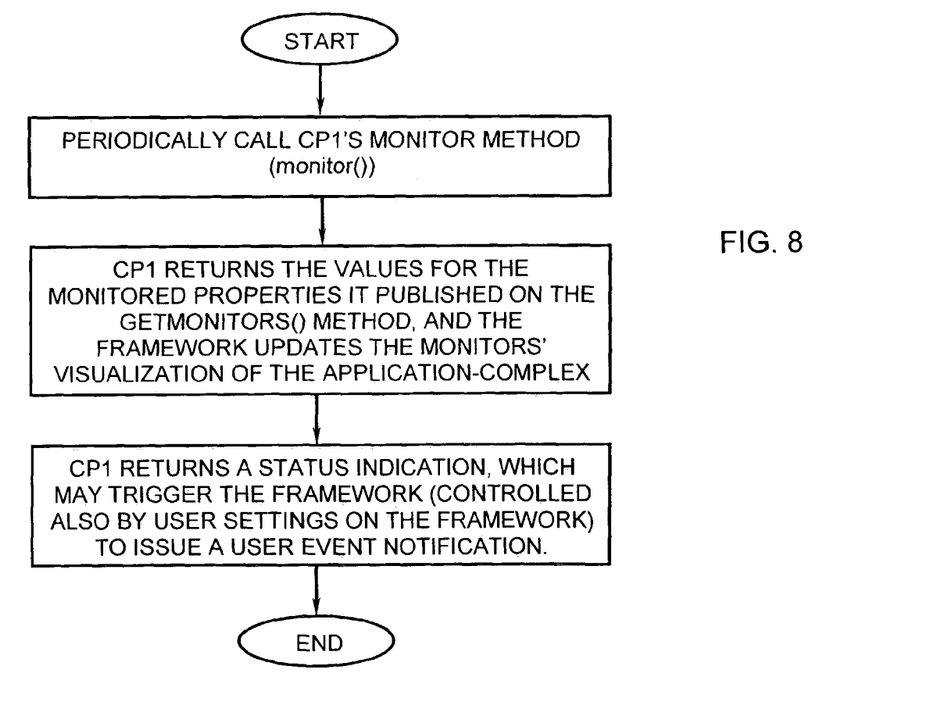

FIG. 8 depicts the monitoring and status indication of properties of the application-complex.

The framework calls CP1.monitor( ) (done periodically)

CP1 returns the values for the monitored properties it published on the getMonitors( ) method, and the framework updates the monitors visualization of the application-complex. In the example, CP1, in the monitor method, gets the CPU utilization of each of the Web servers contained in the second tier, computes the average, and returns an AppComplexState object with the following field values: status—STATUS_OK (assuming the average CPU utilization is under the threshold property value, entered by the user), message: null (not used in our example), monitors: array of one float element—the computed average CPU utilization.

CP1 also returns a status indication, which may trigger the framework (controlled also by user settings on the framework) to issue a user event notification. Thus, in the example, if the average CPU utilization were above the threshold property value, CP1 would put in the status field of the AppComplexState it returns in the monitor method a value other than STATUS_OK, e.g., STATUS_PERFORMANCE_PROBLEM, and the framework, according to user settings, may issue a user event notification, e.g., a message box on the GUI screen or an email message to a configured user email address.

Figure 9:
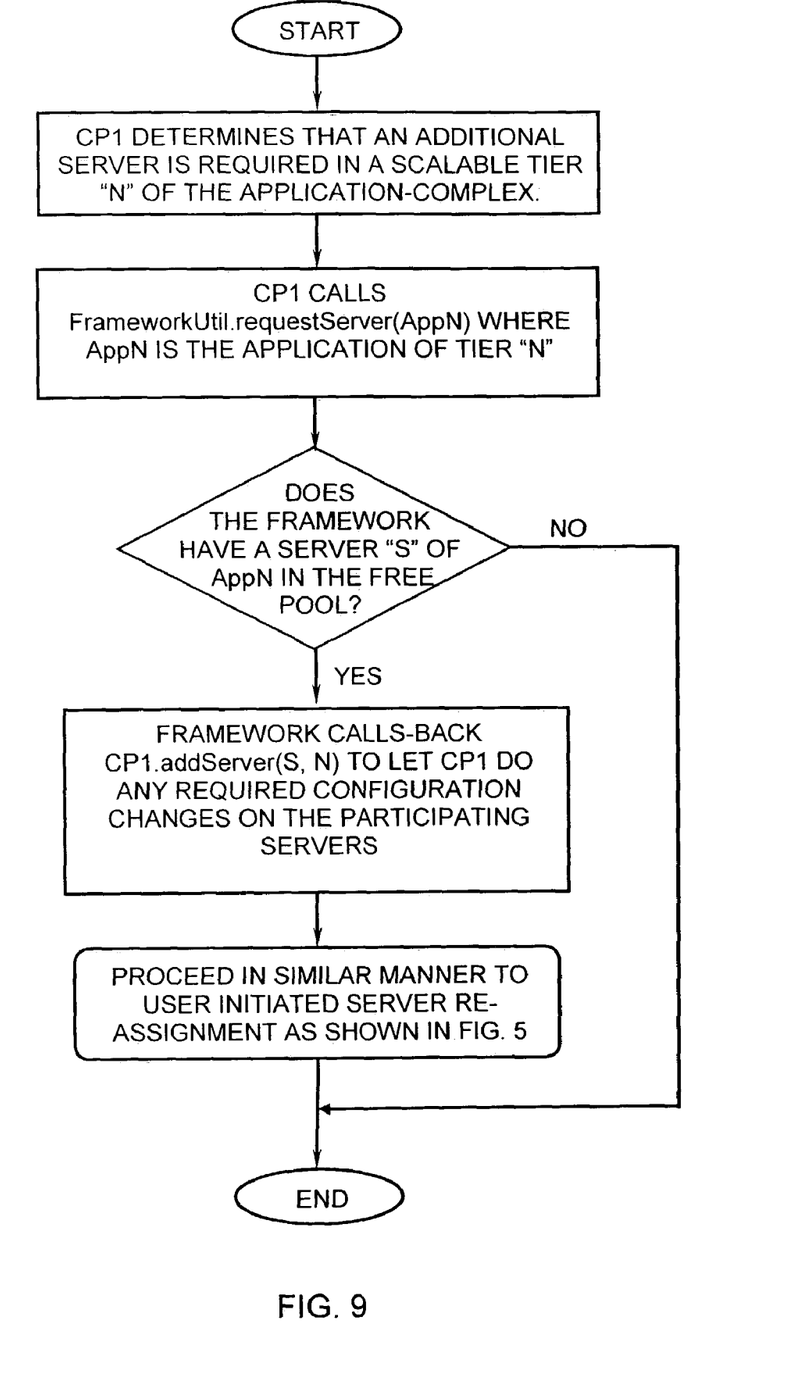

FIG. 9 depicts a first kind of automatically generated change in the configuration of the application-complex.

CP1 determines (according to performance analysis and possibly user input values for threshold properties) that additional server is required in tier N (scalable tier) of the application-complex. In the example, CP1 determines that an additional Web server is required, since the average CPU utilization of the Web servers was above the threshold property for some amount of time.

CP1 calls FrameworkUtil.requestServer(AppN) where AppN is in general the application of tier N and in our example is "Web server" in tier 2.

If the framework has a server S of AppN in the free pool it calls-back CP1.addServer(S, N) to let CP1 do any required configuration changes on the participating servers. In our example, if the framework has a free Web server in the free pool it calls CP1 to add it to its second tier. From this point on it is similar to the scenario shown in FIG. 5, where the user initiated the adding of S.

The framework provides visualization of the newly assigned server inside the N's tier of the application-complex (instead of being in the free pool).

Figure 10:
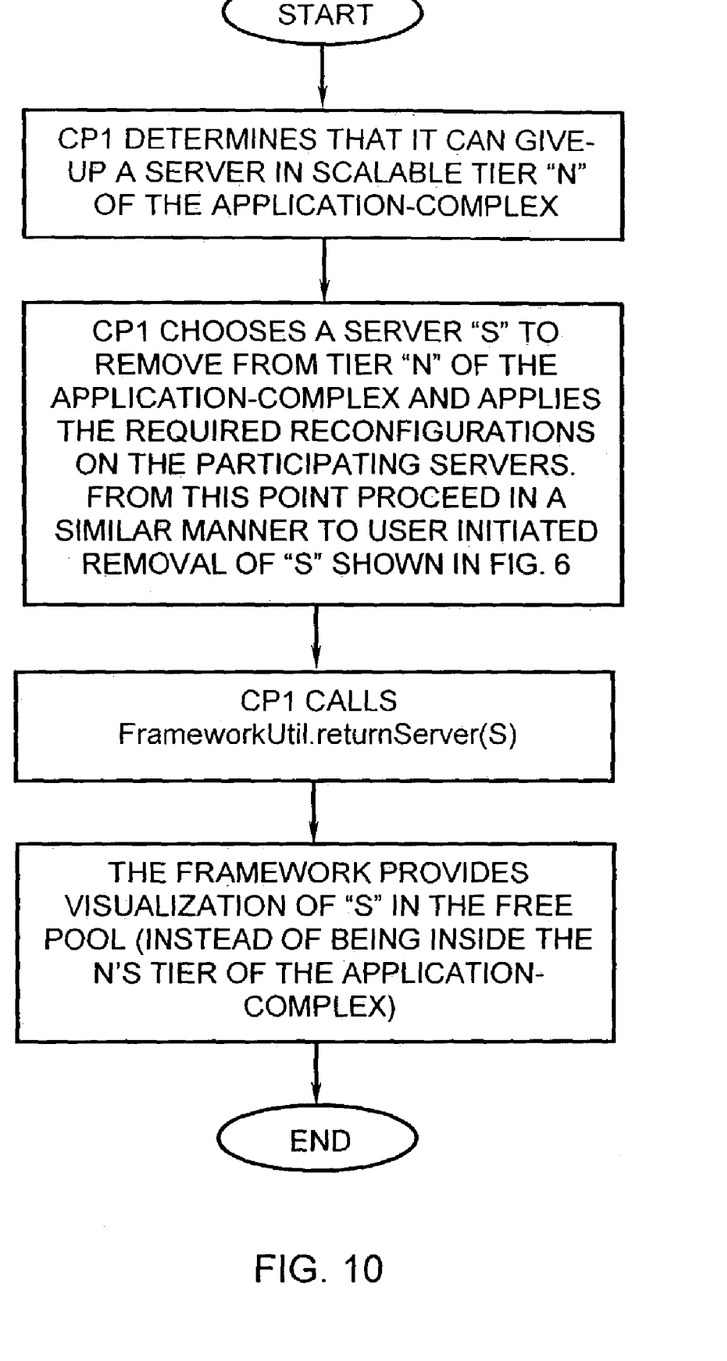

FIG. 10 depicts a second kind of automatically generated change in the configuration of the application-complex.

CP1 determines (according to performance analysis and possibly user input values for threshold properties) that it can give-up a server in tier N (scalable tier) of the application-complex. In the example, CP1 determines that it can give up a Web server, since the average CPU utilization of the Web servers was below the threshold property for some amount of time.

CP1 chooses a server S to remove from tier N of the application-complex and applies the required reconfigurations on the participating servers. From this point on it is similar to the scenario described above with reference to FIG. 7, where the user initiated the removal of S.

CP1 calls FrameworkUtil.returnServer(S).

The framework provides visualization of S in the free pool (instead of being inside the N's tier of the application-complex).

Implementation Notes:

The above example of Java interface for the plugin assumes that internal data of application-complexes (e.g., properties, servers) is maintained by the Configuration-Provider object itself. Alternatively, the data could be stored by the framework (in a persistent storage), while keeping Configuration-Provider objects stateless. In this case, the relevant internal data (e.g., properties) will have to be delivered as additional arguments to the methods of the Configuration-Provider interface invoked by the framework.

Server configuration can be applied by a Configuration-Provider plugin directly (i.e., without the framework intervention) via different mechanisms (e.g., SNMP, or contacting a plugin agent that runs on the server). On some implementations (as in the described preferred embodiment) the framework may handle the management access to the servers, by having a framework management agent running on each server. On such implementations the management agent can have plugin code extensions, and the framework can offer utility methods for the plugin to access its agent extension code (e.g. on Java implementation—FrameworkUtil.invokeStaticMethod by which the Configuration-Provider plugin asks the framework to invoke a static method on his class on a specific server).

It will also be understood that the framework according to the invention may be implemented on a suitably programmed computer. Likewise, the invention contemplates a computer program being readable by a computer for executing the method of the invention. The invention further contemplates a machine-readable memory tangibly embodying a program of instructions executable by the machine for executing the method of the invention.

We claim:

1. A method of managing application complexes using a management framework adapted for execution by a processor, each application complex comprising multiple tier of servers, where servers in the same tier run an identical application and the servers of the multiple tiers work together to provide a specific service, each of said application complexes being definable via a respective application-complex type, the method comprising:

providing configuration information to the framework regarding an application-complex type via a respective plugin that supports said application-complex type wherein the configuration information provided by said plugin encapsulates a relationship between one or more resources composing the respective application-complex type and respective characteristics of said resources;

responding to user operation input to said framework via a user interface that is adapted to the application-complex type according to the configuration information provided by said plugin;

defining an application complex as an instance of said application-complex type according to the configuration information provided by said plugin;

allowing a user to control the association of servers with the multiple tiers of the application complex;

managing by the framework multiple application complexes of different types based on the configuration information provided by said plugin for each respective application-complex type, detecting by the framework an event at a level of an application complex to which the framework is to respond in conjuction with the plugin; and in response to the event, applying by the framework, in cooperation with said plugin, configuration operations on application complexes of the respective application-complex type, using a plugin interface that defines a software protocol indicating to the framework how to exchange information with the plugin for configuring an instance of an application complex.

2. The method according to claim 1, wherein said configuration information provided by the plugin includes information relating to the type of the application complex, the number of tiers, the application which the servers in each tier should run, and one or more properties of the application complex whose values can be specified by the user for each instance of the application-complex type.

3. The method according to claim 1, wherein the plugin is responsive to a change in one or more properties of the application complex for updating the framework and configuring at least one of said servers in accordance with said change.

* * * * *